United States Patent [19]

Fukushima et al.

[11] 3,865,956

[45] Feb. 11, 1975

[54] PROCESS FOR PRODUCING SOYBEAN FOOD PASTE AND THE RESULTING PRODUCT

[75] Inventors: Danji Fukushima, Omiya; Terumitsu Hattori; Akira Arai, both of Noda, all of Japan

[73] Assignee: Kikkoman Shoyu Co., Ltd., Noda, Noda-shi, Japan

[22] Filed: Dec. 15, 1972

[21] Appl. No.: 315,508

[30] Foreign Application Priority Data
Dec. 17, 1971  Japan.............................. 46-101844
Dec. 21, 1971  Japan.............................. 46-103225

[52] U.S. Cl.................. 426/195, 426/199, 426/362, 426/372, 426/468, 426/202
[51] Int. Cl............................................. A23d 5/00
[58] Field of Search ........... 426/202, 205, 429, 372, 426/377, 468, 93

[56] References Cited
UNITED STATES PATENTS 3,346,390  10/1967  Pichel ............................... 426/362
3,619,207  11/1971  Dzurik .............................. 426/372 X
3,620,755  11/1971  Hoffman .......................... 426/205 X

*Primary Examiner*—Raymond N. Jones
*Attorney, Agent, or Firm*—Cushman, Darby & Cushman

[57] ABSTRACT

Soybean food paste free from soybean smell is produced by roasting soybeans or defatted soybeans under an atmospheric pressure; or heating the soybeans or defatted soybeans under a high pressure in the state of low moisture content and then releasing the pressure rapidly thereby to expand the beans; pulverizing the roasted or expanded soybeans to 200 microns or less; then mixing the resulting powders with an edible fat or oil which is solid or semi-solid at a room temperature, if necessary, together with an emulsifying agent, seasoning agent, spice and/or other food additives; and kneading the resulting mixture.

17 Claims, No Drawings

PROCESS FOR PRODUCING SOYBEAN FOOD PASTE AND THE RESULTING PRODUCT

This invention relates to a process for producing a soybean food paste, and more particularly to a process for producing a soybean food paste, which comprises roasting soybeans or defatted soybeans under an atmospheric pressure; or heating the soybeans or defatted soybeans under a high pressure in the state of low moisture content and then releasing the pressure rapidly thereby to expand the beans; pulverizing the roasted or expanded soybeans to 200 microns or less; then mixing the resulting powders with an edible fat or oil which is solid or semi-solid at a room temperature, if necessary, together with an emulsifying agent; seasoning agent, spice and or other additives; and kneading the resulting mixture.

Soybeans have many advantages, for example, high protein content, good protein quality, high nutritive value, low cost and possibility of stable supply to the market, and therefore the soybeans are widely utilized as a good protein source. Particularly, soybean protein has a high content of essential amino acids such as lysine, and it is obvious from various test data that the nutritive value can be considerably increased when man takes the soybeans together with foods prepared from raw materials having an extremely low lysine content, such as wheat flour, for example, together with bread, biscuit, snacks, etc.

It seems that a food paste such as peanut butter is suitable as a food taken together with the bread, biscuit, snacks, etc. Therefore, it seems that the soybeans would be a very useful food, if they can be processed into the food paste.

However, the soybeans have a special bean smell and a rigid texture, and cannot be utilized as a food, which meets the object of the present invention.

An object of the present invention is to provide an oily soybean food paste pleasant to the palate and a process for producing the same, which comprises roasting soybeans or defatted soybeans under an atmospheric pressure, then pulverizing the roasted beans, mixing the resulting powders with an edible fat or oil which is solid or semi-solid at a room temperature, if necessary, together with an emulsifying agent, seasoning agent, spice and/or other food additives, and kneading the resulting mixture.

Another object of the present invention is to provide a soybean food paste pleasant to the palate and free from soybean smell and a process for producing the same, which comprises heating soybeans or defatted soybeans under a high pressure, and then releasing the pressure rapidly thereby to expand the beans, pulverizing the expanded beans to 200 microns or less, mixing the resulting powders with an edible fat or oil which is solid or semi-solid at a room temperature, if necessary, together with an emulsifying agent, seasoning agent, spice and/or other food additive, and kneading the resulting mixture.

As soybean protein products having an improved texture and being free from soybean smell, there are the so-called soybean protein concentrates or soybean protein isolates, for example, New Fujinick (a trade mark of the product made by Fuji Seiyu K. K., Japan), Ajipron 300 (a trade mark made by Ajinomoto K. K., Japan), and it has seemed that these soybean products could be utilized.

These products are considerably free from the soybean smells, and have a high protein content, but when these products were pulverized, added to oil or fat and kneaded to prepare food pastes having a peanut butter feeling, the pastes were almost free from the soybean smells, but were very gritty. That is, eating feelings, for example, tongue feeling, tooth feeling, etc. were very disagreeable. Therefore, it was impossible to use these pastes as a substitute for peanut butter, etc. or as a mixed product.

As a result of study of food pastes prepared by roasting soybeans or defatted soybeans, raw materials for said soybean protein concentrates or soybean protein isolates, under an atmospheric pressure, and then pulverizing the roasted beans, mixing the powders with oil or fat and kneading the mixture, the present inventors have found that the pastes have no gritty feeling though there is a soybean smell.

It is seen from the foregoing finding that the extremely gritty feeling obtained when the soybean protein concentrates or soybean protein isolates are used is due to the liberation of substances, which have so far protected the protein physically, into water from the soybean together with the soybean flavor constituents during the process for producing the soybean protein concentrates or soybean protein isolates from the soybeans or defatted soybeans, and consequent change of the protein texture from the smooth state to rigid and gritty state.

During the process for producing soybean protein concentrates or soybean protein isolates, the soybean smell as well as a large amount of soybean components are removed together with water. As a process for removing the smell without any elimination of such protein-protecting substances, there is available a process comprising placing soybeans or defatted soybeans in an extruder and expanding the beans. According to that process, the raw material soybeans are placed into the extruder after 20 to 30 % of water has been added to the soybeans, and conveyed at a high temperature and a high pressure. Then, the raw material soybeans are discharged to the atmosphere under the lower pressure from a small opening together with saturated steam at the high temperature and high pressure. At that time, the water in the raw material is rapidly expanded and evaporated, and the texture is broken and expanded. At the same time, the soybean flavor constituents in the soybeans are also evaporated and given off. Therefore, it has seemed that, when the soybeans or defatted soybeans are treated according to that process, the protein-protecting substances are not removed, and therefore a soybean food paste having a less soybean smell and being pleasant to the palate can be obtained. When a product prepared by adding 20 to 30 percent of water to soybeans or defatted soybeans, placing the beans in an extruder and extruding the beans at a high temperature and a high pressure from a small opening to the atmospheric pressure thereby to expand the beans, or a commercial available product, Texgran (a trade mark of the product made by Swift Co. U.S.A.), which seems to be produced according to a process similar to the above-mentioned one, is pulverized to powders of 200 microns or less, and mixed with fat or oil to prepare food having an eating feeling like that of the peanut butter, only products having a gritty feeling were obtained, contrary to expectation.

As a result of study of the reasons for the gritty feeling, it has been made clear that, even if the protein-protecting substances exist together with protein, the heating in the presence of water is a cause for the gritty feeling, and further expansion of the beans heated in the presence of water has no effect upon the improvement of gritty feeling.

As a result of further study based on these findings, the present inventors have succeeded in producing a soybean food paste free from any gritty feeling and soybean smells at all, but having a very good eating feeling such as tongue feeling, tooth feeling, etc. according to the present process as mentioned before.

Since the soybeans or defatted soybeans prepared by heat treatment according to said process are used as a raw material and pulverized to 200 microns or less in the present invention, the food paste thus prepared has a very good tongue feeling and tooth feeling, and further has no soybean smells, and therefore is very excellent as a product containing soybean protein and a peanut butter-like eating feeling.

Now, these facts will be shown, referring to an experimental example. The experimental example shows comparison of the process for treating soybeans of the present invention with other so far well known processes.

EXPERIMENTAL EXAMPLE

Soybean smell and eating feeling of food pastes prepared according to different processes for treating soybeans

| Examples | Conditions for treating the raw material soybeans | Paste product Soybean smell | Degree of grittyness |
|---|---|---|---|
| A | Wet heat-treated defatted soybeans | ++ | + |
| B | Soybean protein isolate | − | ++ |
| C | Soybean protein concentrate (1) | − | ++ |
| D | Soybean protein concentrate (2) | − | ++ |
| E | Wet heat- and expansion-treated defatted soybean | ± | + |
| F | Atmospheric, dry heat-treated defatted soybean (present process I) | ++ | − |
| G | Dry heat- and expansion-treated defatted soybeans (present process II) | − | − |

Remark:

A: Defatted soybeans are treated with saturated steam at 100°C under the atmospheric pressure for 60 minutes and dried (protein content of the product: and 50 percent).

B: Defatted soybeans, which have been subjected to oil extraction at a low temperature, are admixed with a 15-fold volume of water, stirred at 45°C for 60 minutes and filtered, The filtrate is admixed with hydrochloric acid to make pH 4.5, and the resulting precipitates are collected, washed, neutralized, and dried (protein content of the product: about 95 percent).

C: Defatted soybeans are treated with saturated steam under a gauge pressure of 1 kg/cm² for 15 minutes to insolubilize the protein, then washed with a 15-fold volume of hot water at 50°C to remove soybean smells, carbohydrates and other water-soluble components, and dried (protein content of the product: about 70 percent).

D: Defatted soybeans are admixed with 30 percent (V/W) of water by sprinkling, placed in an extruder, extruded from a small opening at a mean temperature of 110°C under a gauge pressure of 25 kg/cm² for a retention time of 3 minutes to effect expansion treatment, then washed with a 10-volume of water to remove soybean smells, carbohydrates and other water-soluble components, and then dried (protein content of the product: about 70 percent).

E: After the expansion treatment under the same conditions as in the foregoing D, the soybeans are dried without washing (protein content of the product: about 50 percent).

F: Defatted soybeans are subjected to dry heating treatment in air at 170°C under the atmospheric pressure for 20 minutes (protein content of the product: about 50 percent).

G: Defatted soybeans are suspended in superheated steam at 250°C under a gauge pressure of 6.5 kg/cm² for 10 seconds, and rapidly exposed to the atmosphere (protein content of the product: about 50 percent).

The soybean protein raw materials treated under the respective conditions A, B, C, D, E, F and G as described above, are pulverized to powders of 200 microns or less, and 160 g of the powders is added to 100 g of solid fat having a melting point of 42°C, individually. The protein product is prepared by kneading the mixture. Degrees of soybeans smell and grittyness of these products are represented by + (plus) or − (minus) sign.

As to the soybean smell:

"−" means no soybean smell at all.

"+" means the degree of residual soybean smell. The more plus signs, the stronger the smell.

As to the degree of grittyness:

− means no grittyness at all.

+ means the degree of grittyness. The more minus signs, the higher the degree of grittyness.

According to the present invention, soybeans or defatted soybeans are roasted at 130° to 300°C, preferably 200° to 230°C, under an atmospheric pressure as a heat treatment, and the roasting time is properly selected in a range of from 5 sec. to 30 min., preferably 5 sec. to 40 sec., depending upon the roasting temperature. Under a high pressure, the heating is carried out at a temperature of 150° to 350°C, preferably 180° to 300°C, under a pressure of 3 - 10 kg/cm², preferably 5 to 7 kg/cm², but the heating time is selected (properly) in a range of 2 sec. to 60 sec. preferably 5 sec. to 20 sec.

The moisture content in soybeans or defated soybeans to be used during roasting or heating is important to effect the purpose of the present invention and it must be 17 percent by weight or less, preferably 12 percent by weight or less. Therefore, a saturated steam cannot be used in heating.

The soybeans or defatted soybeans treated according to the present invention are at first pulverized, but it is necessary to pulverize the beans to 200 microns or less to obtain eating feeling free from the grittyness or effect homogeneous mixing with fat or oil. In the case of particle sizes over 200 microns, the soybeans or defatted soybeans will be ground to fine powders by kneading for a prolonged time, but such operation requires too much time, and therefore is pratically inpracticable.

Any fat or oil can be used in the present invention, so long as it can be kept entirely in a solid or semi-solid state at room temperature. That is to say, any edible fat or oil, for example, shortenings, hardened oil prepared from animal or vegetable oils as raw material, coconut oil, tallows, lards, etc. can be used.

A liquid oil can be also used, but in that case, it is necessary to use it together with solid or semi-solid fat or oil, and its mixing ratio must be restricted to such an amount of liquid oil that can maintain the fat or oil in a solid or semi-solid state at the ordinary temperature after the mixing.

Of course, the higher the melting point of solid fat or oil to be used together with the liquid oil, the more the usuable volume of the liquid oil.

If a smaller amount of solid or semi-solid fat or oil is added to the powders obtained by heat-treating soybeans or defatted soybeans and pulverizing them to 200 microns or less, a harder product can be obtained, inversely a softer product can be obtained when a larger amount of solid or semi-solid fat or oil is added thereto. However, 20 to 200 parts by weight, preferably 25 to 100 parts by weight of solid or semi-solid fat or oil is usually added to 100 parts by weight of soybeans or defatted soybeans.

When a soybean food paste having a peanut butter-like eating feeling is prepared according to the present invention, seasoning agents such as table salt, sugar, sodium glutamate, and others; spices such as pepper, cinnamon, paprica, and the like; emulsifying agents such as monoglyceride, lecithin and other natural and synthetic emulsifying agents or other food additives such as vanilin and natural or synthetic perfumes can be properly added to the paste, when required, depending upon the end use of the paste, but it is desirable that these additives must be pulverized to fine powders in advance to the addition to the paste.

As the raw material for the present invention, any of soybeans or defatted soybeans can be, of course, used, but in view of the reservability or stability, a better product can be obtained from the defatted soybeans, and in view of flavor or tongue feeling, a better product can be obtained from the soybeans.

The soybean food paste prepared according to the present invention has a high protein content, and can considerably increase the protein content of peanut butter and improve the nutritive value thereof, when the paste is admixed into the peanut butter.

When the paste is admixed into expanded cereals, and other morning cereals, or snack foods, or coated onto the surface thereof, protein snacks enriched in protein can be prepared.

Of course, the present paste can be used in the same uses as with the peanut butter, for example, pasting the bread and cakes to eat.

Now, the present invention will be explained, referring to Examples.

EXAMPLE 1

Whole soybeans were roasted directed over fire through a metallic wire net, and coarsely ground to remove outer skins, and then pulverized to powders in an impact-type pulverizer.

Then, 160 kg of the resulting powders were added to 100 kg of shortening having a melting point of about 42°C, and then placed in a Mueller-type kneader together with 50 kg of sugar finely pulverized in advance, and kneaded for 30 minutes, whereby 310 kg of a peanut butter-like soybean food paste pleasant to the palate was obtained.

EXAMPLE 2

Whole soybeans were placed in a rotary roaster together with sand, roasted at 220°C for 30 seconds, separated from the sand, and pulverized to powders in a high speed pulverizer.

Then, 160 kg of the resulting powders were added to 40 kg of shortening having a melting point of about 38°C and 20 kg of table salt and 5 kg of sodium glutamate finely pulverized in advance, and kneaded in a Mueller-type kneader for 30 minutes, whereby 225 kg of peanut butter-like soybean food paste pleasant to the palate were obtained.

The resulting paste had a high protein content, and was coated onto morning cereals or snacks to increase their protein content, and prepare the cereals or snacks of high nutritive value.

EXAMPLE 3

Defatted soybeans were made in contact with hot air at 170°C for 20 minutes, and then pulverized in a turbomill.

Then, 160 kg of the resulting powders were added to 132 kg of solid fat having a melting point of about 40°C, 1 kg of monoglyceride and 55 kg of sugar finely pulverized in advance, and kneaded in a Mueller-type kneader for 30 minutes, whereby 348 kg of peanut butter-like soybean food paste pleasant to the palate was obtained.

EXAMPLE 4

Whole soybeans were dehulled, flaked, and suspended in superheated steam at 250°C under a gauge pressure of 6.5 kg/cm$^2$ for 10 seconds without any addition of water, and then exposed rapidly to the atmosphere to expand the beans. The resulting expanded beans were pulverized to powders having particle sizes of less than 100 microns in a turbo-mill, and 160 kg of the resulting powders were added to 100 kg of shortening having a melting point of about 42°C, and placed in a Mueller-type kneader together with 50 kg of sugars finely pulverized in advance, whereby 310 kg of peanut butter-like soybean food paste pleasant to the palate was obtained.

The resulting paste could be used in the same uses as with the peanut butter.

EXAMPLE 5

Whole soybeans were subjected to expansion treatment, and pulverization treatment in the same treating conditions as in Example 4, and 160 kg of the resulting powders were added to 40 kg of shortening having a melting point of about 38°C, and 20 kg of table salt and 5 kg of sodium glutamate finely pulverized in advance, and kneaded in a Mueller-type kneader for 30 minutes, whereby 225 kg of soybean food paste free from soybean smells and pleasant to the palate was obtained.

The resulting paste had a high protein content, and was coated onto morning cereals or snacks to elevate

EXAMPLE 6

Defatted soybeans were suspended in superheated stream at 250°C under a gauge pressure of 6.5 kg/cm² for 10 seconds without any addition of water, and then exposed rapidly to the atmosphere. The resulting expanded, defatted soybeans were pulverized to mean particle size of 80 microns, and 160 kg of the powders were added to 132 kg of solid fat having a melting point of about 40°C, 1 kg of monoglyceride and 55 kg of sugar finely pulverized in advance, and kneaded for 30 minutes in a Mueller-type kneader, whereby 348 kg of peanut butter-like soybean food paste free from soybean smells and pleasant to the palate was obtained.

What is claimed is:

1. A process for producing an oily soybean food paste, which comprises at atmospheric pressure dry roasting soybeans or defatted soybeans having a moisture content of 17 percent by weight or less at 130° to 300°C. for 4 seconds to thirty minutes, pulverizing the beans to 200 microns or less, mixing the resulting powders with an edible fat or oil which is solid or semi-solid at a room temperature and kneading the resulting mixture.

2. A process for producing an oily soybean food paste, which comprises dry heating soybeans or defatted soybeans having a moisture content of 17 percent by weight or less under a pressure of 3 to 10 kg/cm² at 150° to 350°C. for 2 to 60 seconds, and then releasing the pressure rapidly thereby to expand the beans, pulverizing the expanded beans to 200 microns or less, mixing the resulting powders with an edible fat or oil which is solid or semi-solid at a room temperature, and kneading the resulting mixture.

3. An oily soybean food paste comprising a powder of soybeans of defatted soybeans obtained by dry roasting soybeans or defatted soybeans having a moisture content of 17 percent by weight or less under atmospheric pressure at 130° to 300°C. for 5 seconds to 30 minutes, pulverizing the beans to 200 microns or less and an edible fat or oil which is solid or semi-solid at room temperature, the ratio of the powders of soybeans or defatted soybeans to the edible fat or oil being 100:20 to 100:200 by weight and kneading the resulting mixture.

4. An oily soybean food paste comprising a powder of soybeans or defatted soybeans obtained by dry heating soybeans or defatted soybeans having a moisture content of 17 percent by weight or less at 150° to 350°C. for 2 to 60 seconds under a pressure of 3 to 10 kg/cm² and releasing the pressure rapidly thereby to expand the beans and pulverizing the beans to 200 microns or less and an edible fat or oil which is solid or semi-solid at room temperature, the ratio of the powders of soybeans or defatted soybeans to the edible fat or oil being 100:20 to 100:200 weight, and kneading the resulting mixture.

5. A process according to claim 1, wherein to the mixture are added an emulsifying agent, seasoning agent and spice.

6. A process according to claim 1, wherein to 20 to 200 parts by weight of the edible fat or oil is added 100 parts by weight of the powders of soybeans or defatted soybeans.

7. A process according to claim 1, wherein the edible fat or oil is shortening, hardened oil prepared from animal oil or vegetable oil as raw material, coconut oil, tallows or lards.

8. A process according to claim 2, wherein to the mixture is added an emulsifying agent, seasoning agent and spice.

9. A process according to claim 2, wherein the soybeans or defatted soybeans is that containing 17 percent by weight or less of moisture.

10. A process according to claim 2, wherein the heating is carried out under a pressure of 3 to 10 kg/cm² at 150° to 350°C for 5 to 20 seconds.

11. A process according to claim 2, wherein the heating is carried out by superheated steam.

12. A process according to claim 2, wherein to 20 to 200 parts by weight of the edible fat or oil is added 100 parts by weight of the powders of soybeans or defatted soybeans.

13. A process according to claim 2, wherein the edible fat or oil is shortening, hardened oil prepared from animal oil or vegetable oil as raw material, coconut oil, tallow or lard.

14. A product according to claim 3 including an emulsifying agent, seasoning agent or spice.

15. A product according to claim 4 including an emulsifying agent, seasoning agent or spice.

16. A process according to claim 1 wherein the roasted material is defatted soybeans.

17. A process according to claim 2 wherein heating is carried out with defatted soybeans.

* * * * *